(12) United States Patent
Kawai et al.

(10) Patent No.: US 6,655,489 B2
(45) Date of Patent: Dec. 2, 2003

(54) PEDAL DISPLACEMENT PREVENTION STRUCTURE FOR A VEHICLE AND A VEHICLE THEREOF

(75) Inventors: Taro Kawai, Okazaki (JP); Isao Ueda, Okazaki (JP)

(73) Assignee: Mitsubishi Jidosha Kogyo Kabushiki Kaisha (JP)

(*) Notice: Subject to any disclaimer, the term of this patent is extended or adjusted under 35 U.S.C. 154(b) by 2 days.

(21) Appl. No.: 10/135,193

(22) Filed: Apr. 29, 2002

(65) Prior Publication Data
US 2002/0179359 A1 Dec. 5, 2002

(30) Foreign Application Priority Data

Apr. 27, 2001 (JP) .................................. 2001-133455
Mar. 5, 2002 (JP) .................................. 2002-059281

(51) Int. Cl.$^7$ ................................ B60T 7/22
(52) U.S. Cl. ........................ 180/274; 74/512
(58) Field of Search .................... 180/274, 281, 180/282, 90, 90.6; 74/512, 513

(56) References Cited

U.S. PATENT DOCUMENTS 6,041,674 A * 3/2000 Kato ........................... 74/512
6,327,930 B1 * 12/2001 Ono et al. ..................... 74/512
6,418,812 B2 * 7/2002 Mizuma et al. ................ 74/512
6,481,311 B1 * 11/2002 Sanagi et al. .................. 74/512
6,539,823 B1 * 4/2003 Tomono et al. ................ 74/512

* cited by examiner

Primary Examiner—Eric Culbreth
Assistant Examiner—Faye M. Fleming
(74) Attorney, Agent, or Firm—Rossi & Associates

(57) ABSTRACT

A vehicular pedal displacement prevention structure has a rotatable lever, which can be brought into contact with a pedal arm, provided at an end of an extending side of a pedal bracket, and a guide member opposed to the rotatable lever provided in a deck cross pipe disposed at the rear of a vehicle to be remote from a dash panel. When an external force equal to or greater than a predetermined value is applied to the front of the vehicle to move a pedal bracket toward the rear of the vehicle, the rotatable member is brought into contact with the guide member, which causes the rotatable member to rotate. The rotating action of the rotatable lever relatively displaces the pedal arm toward the front of the vehicle. This prevents rearward displacement of a pedal in a head-on collision of the vehicle with a simple structure that does not require high assembling accuracy.

18 Claims, 8 Drawing Sheets

PEDAL DISPLACEMENT PREVENTION STRUCTURE FOR A VEHICLE AND A VEHICLE THEREOF

This non-provisional application claims priority under 35 U.S.C. §119(a) on Patent Application No. 2001-133455 filed in Japan on Apr. 27, 2001, and No. 2002-059281 filed in Japan on Mar. 5, 2002, which are herein incorporated by reference.

BACKGROUND OF THE INVENTION

1. Field of the Invention

This invention relates to a vehicular pedal displacement prevention structure that is capable of preventing rearward displacement of the vehicular pedals in a head-on collision of a vehicle.

2. Description of the Related Art

In general, vehicles, such as a motor vehicle, are equipped with a suspended brake pedal (e.g. vehicular pedal). This vehicular pedal is suspended on a dash panel partitioning the vehicle into an engine compartment or room in front of the vehicle and a vehicle compartment, by a pedal bracket. Further, the vehicular pedal is constructed such that it extends to the rear of the vehicle.

Further, the dash panel is a vehicle body component disposed adjacent to an engine in the engine room. Therefore, during a frontal collision of the vehicle, the engine can move toward the rear of the vehicle and press the dash panel. This causes the dash panel to deform and stick out toward the rear of the vehicle. Consequently, the brake pedal can move toward the rear of the vehicle.

Conventionally, to prevent such movement of the vehicular pedal, a displacement prevention structure for preventing the rearward displacement of the brake pedal has been proposed. See Japanese Laid-open Patent Publication (Kokai) No. 11-59351.

The structure disclosed in the Japanese Laid-open Patent Publication (Kokai) No. 11-59351 has a step portion at a predetermined position on the vehicular pedal, which is located below the fulcrum suspending the vehicular pedal. An arm member having the top thereof extending to a point corresponding to and remote from the step portion of the vehicular pedal is fixed to a deck cross member disposed rearward and above the vehicular pedal. In this pedal structure, the stepping of the brake pedal does not interfere with the arm member.

In the brake pedal structure described in the Japanese Laid-open Patent Publication (Kokai) No. 11-59351, if the brake pedal is deformed toward the rear of the vehicle after the frontal collision of the vehicle, the step portion is brought into contact with the top portion of the arm member. The load applied on this occasion bends the arm member downwardly, rotatably displacing the brake pedal toward the front of the vehicle (in a direction in which a pedal surface at the end of the pedal moves toward the front of the vehicle). The rotatable displacement restricts the rearward displacement of the brake pedal toward the rear of the vehicle.

In the brake pedal structure described in above Japanese Laid-open Patent Publication, however, the brake pedal is constructed such that the step portion of the pedal is pushed down by the arm member. For this reason, the brake pedal structure is likely to be complicated in order to maintain assembling accuracy.

More specifically, the brake pedal structure disclosed in the above publication has the following problems. There is the possibility that positions of the step portion of the brake pedal vary according to vehicles because it is necessary to assemble the brake pedal to a vehicle body while adjusting the position of the step surface of the brake pedal and the pedal stroke. Further, to displace the brake pedal toward the front of the vehicle by bending of the arm member, it is necessary to meet the following requirements: (1) the end of the arm member is usually disposed at such a point apart from the step portion as not to affect the movement of the brake pedal; (2) In a head-on collision of vehicles, the end of the arm member must is brought into contact with such a point as to cause rotatable displacement of the step portion of the brake pedal toward the rear of the vehicle. Therefore, the brake pedal structure disclosed in the above publication is likely to be complicated and more costly since it is necessary to meet the additional requirements for maintaining the high assembling accuracy in order to ensure the stable and exact movement.

SUMMARY OF THE INVENTION

It is therefore an object of the present invention to provide a vehicular pedal displacement prevention structure, which is capable of preventing the reward displacement of the vehicular pedal in a head-on collision of a vehicle with high accuracy by a simple structure that does not require high assembling accuracy.

To attain the above object, a vehicular pedal displacement prevention structure includes: a first vehicle component that is displaced toward the rear of the vehicle when external force is applied to the front portion of the vehicle has a pedal bracket extending toward the rear of the vehicle; a pedal arm is rotatably mounted on this pedal bracket; a rotatable lever that is capable of coming into contact with the pedal bracket is mounted to the pedal bracket; and a guide member opposed to the rotatable lever is provided in a second vehicle component disposed at the rear of the vehicle farther from the first vehicle component.

With this arrangement, when an external force equal to or greater than a predetermined value is applied to the front of the vehicle to cause the pedal bracket, as well as the first vehicle component, to move toward the rear of the vehicle, the rotatable lever is brought into contact with the guide member to generate an impact, which causes the rotatable lever to rotate to be brought into contact with the pedal arm. This causes the pedal arm to be relatively displaced toward the front of the vehicle to restrict the rearward movement of thereof.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF PREFERRED EMBODIMENTS

A preferred embodiment of the present invention will now be described with reference to the drawings.

Figure 1:
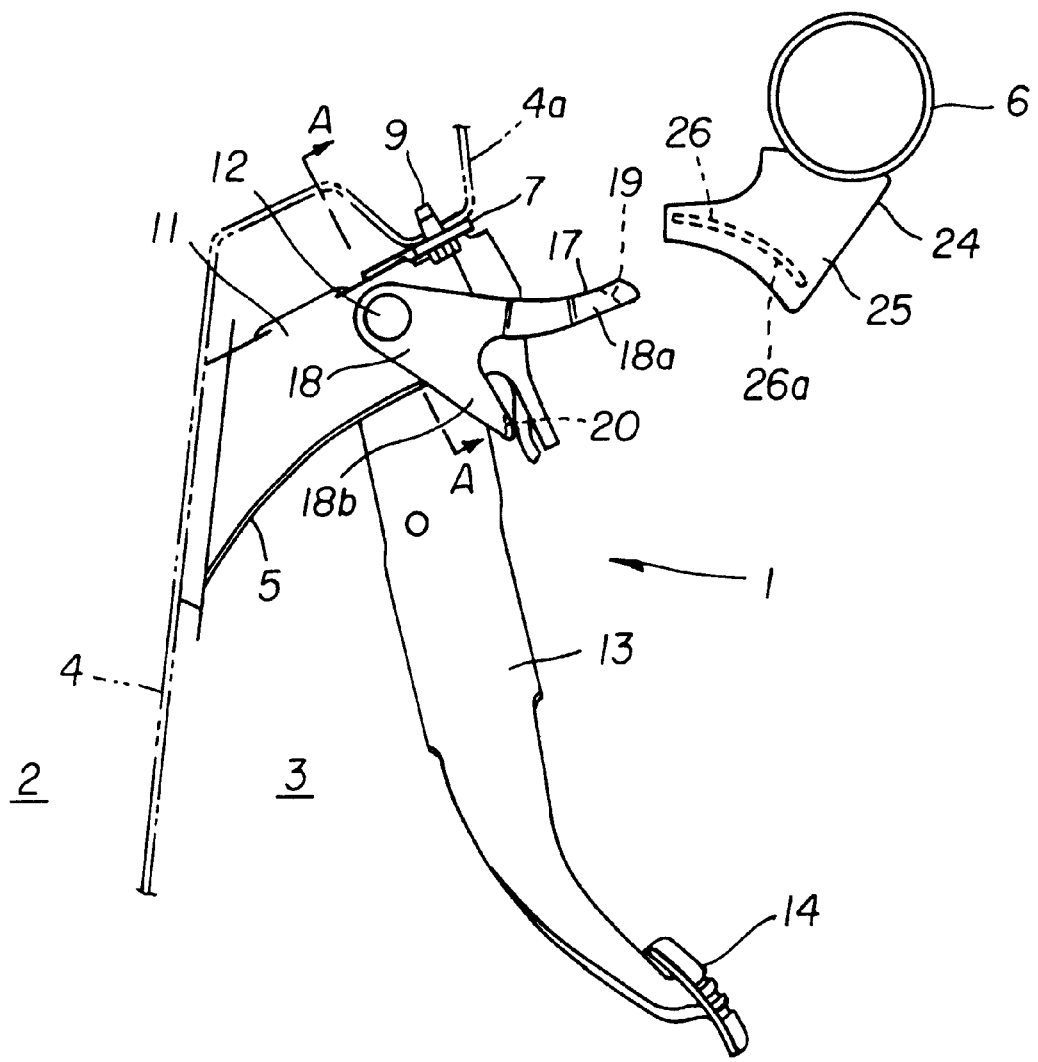
FIG. 1 is a side view showing a vehicular pedal displacement prevention structure according to a first embodiment of the present invention.
Figure 2:
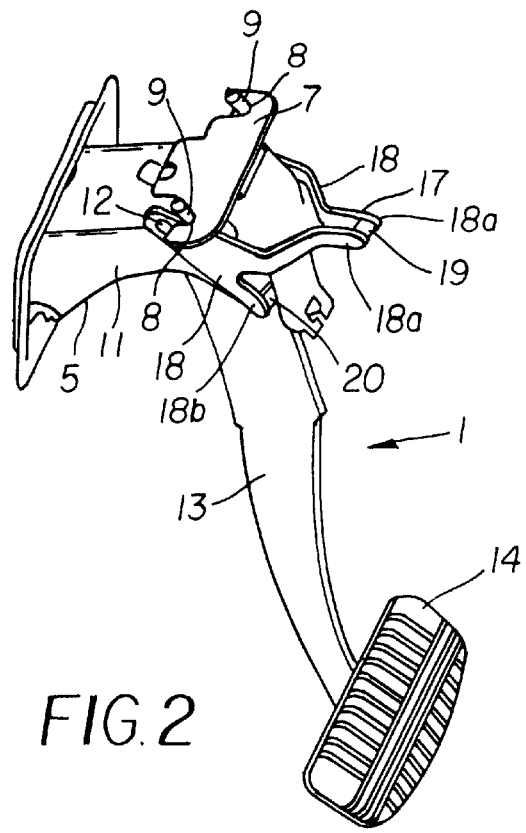
FIG. 2 is a perspective view showing the vehicular pedal displacement prevention structure according to the first embodiment of the present invention.

FIG. 1 to FIG. 4 show a first embodiment. FIG. 1 is a side view showing a suspended brake pedal 1 disposed in a lower portion of a driver's seat in a vehicle body of a passenger car (vehicle), and FIG. 2 is a perspective view thereof.

A dash panel 4 as a first vehicle body component partitions the vehicle into an engine compartment or room 2 disposed in the front of the vehicle and a vehicle compartment 3. A pedal bracket 5 is mounted on the internal surface of the dash panel 4, which faces the vehicle compartment 3, and a deck cross pipe 6 as a second vehicle body component is disposed in the vehicle compartment 3 to be remote from the internal surface of the dash panel 4 in such a manner as to extend along the width of the vehicle.

The pedal bracket 5 is a arm type component extending from the internal surface of the dash panel 4 toward the rear of the vehicle, and a fastening plate 7 that has a U-shaped notch 8 on its both end portions is fixed to the upper surface of an extending side end of the pedal bracket 5.

The fastening plate 7 is disposed in contact with a washer 4a formed on a part of the dash panel 4, and is fastened on the dash panel 4 by a bolt 9 inserted into the washer 4a through the notch 8.

When the pedal bracket 5 is moved toward the rear of the vehicle by the impact while an external force equal to or greater than a predetermined value is applied to the front portion of the vehicle, the U-shaped notch 8 slips out of the bolt 9 to release the pedal bracket 5 from the dash panel 4.

Figure 3:
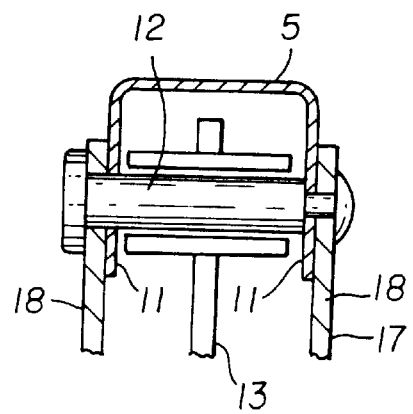
FIG. 3 is a cross section view taken along a line A—A of FIG. 1.

As shown in FIG. 3, the pedal bracket 5 has a pair of side plates 11 opposed to each other, and a spindle 12 is installed between these side plates 11. The spindle 12 can extend through the side plates 11. The top end portion of a pedal arm 13 is rotatably supported on the spindle 12 to suspend the pedal arm 13.

A step surface 14 is fixed to the lower end portion of the pedal arm 13. Stepping the step surface 14 rotates the pedal arm 13 clockwise in figure about the spindle to generate brake force via a brake device that is not illustrated.

A rotatable lever 17 is provided at the end of the extending side of the pedal bracket 5. This rotatable lever 17 has a pair of side plates 18 opposed to each other, and is substantially "V"-shaped in a plan view. Both side plates 18 are fixed to the end of the spindle 12 projecting from the side plate 11 of the pedal bracket 5.

Each side plate 18 of the rotatable lever 17 is branched in a forked form, at the opposed side of a support portion constituted by the support shaft 12; one branch is a first lever portion 18a and the other branch is a second lever portion 18b.

In the rotatable lever 17, the end of the first lever portion 18a of one side plate 18 and the end of the first lever portion 18a of the other side plate 18 are positioned close to each other and connected to each other via a connecting member 19, and a beam connecting member 20 is bridged between the end of the second lever portion 18b of one side plate 18 and the end of the second lever portion 18b of the other side plate 18.

The rotatable lever 17 is disposed to extend from the pedal bracket 5 to the rear of the vehicle such that the connecting member 20 bridged between the second lever portions 18 is opposed with a clearance to a side edge of the pedal arm 13 facing the rear of the vehicle.

The side plates 18 at both sides of the rotatable lever 17 are pressure-welded to the side plate 11 of the pedal bracket 5 by caulking the end portion of the spindle 12, and the resulting frictional force normally keeps the rotatable lever 17 unrotatable. When a rotational force equal to or greater than a predetermined value is applied to the rotatable lever 17, the rotatable lever 17 can rotate about the spindle 12 against the frictional force. The frictional force need not be necessarily generated by caulking, but can be generated, for example, by fastening a nut engaged with the end portion of the spindle 12.

On the other hand, a guide member 24 opposed with a clearance to the rotatable lever 17 is mounted on the deck cross pipe 6 serving as the second vehicle component. The guide member 24 is comprised of a pair of side plates 25 opposed to each other, and a guide plate 26 is positioned intermediate between the side plates 25. The guide plate 26 is opposed to the end of the first lever portion 18a of the rotatable lever 17, and the opposing surface of the guide plate 26 is a guide surface 26a that is gradually curved in a concave form. See FIG. 9.

A description will now be given of the operation.

Normally, the pedal arm 13 rotates about the spindle 12 according to the operation of a brake by the driver.

Figure 4:
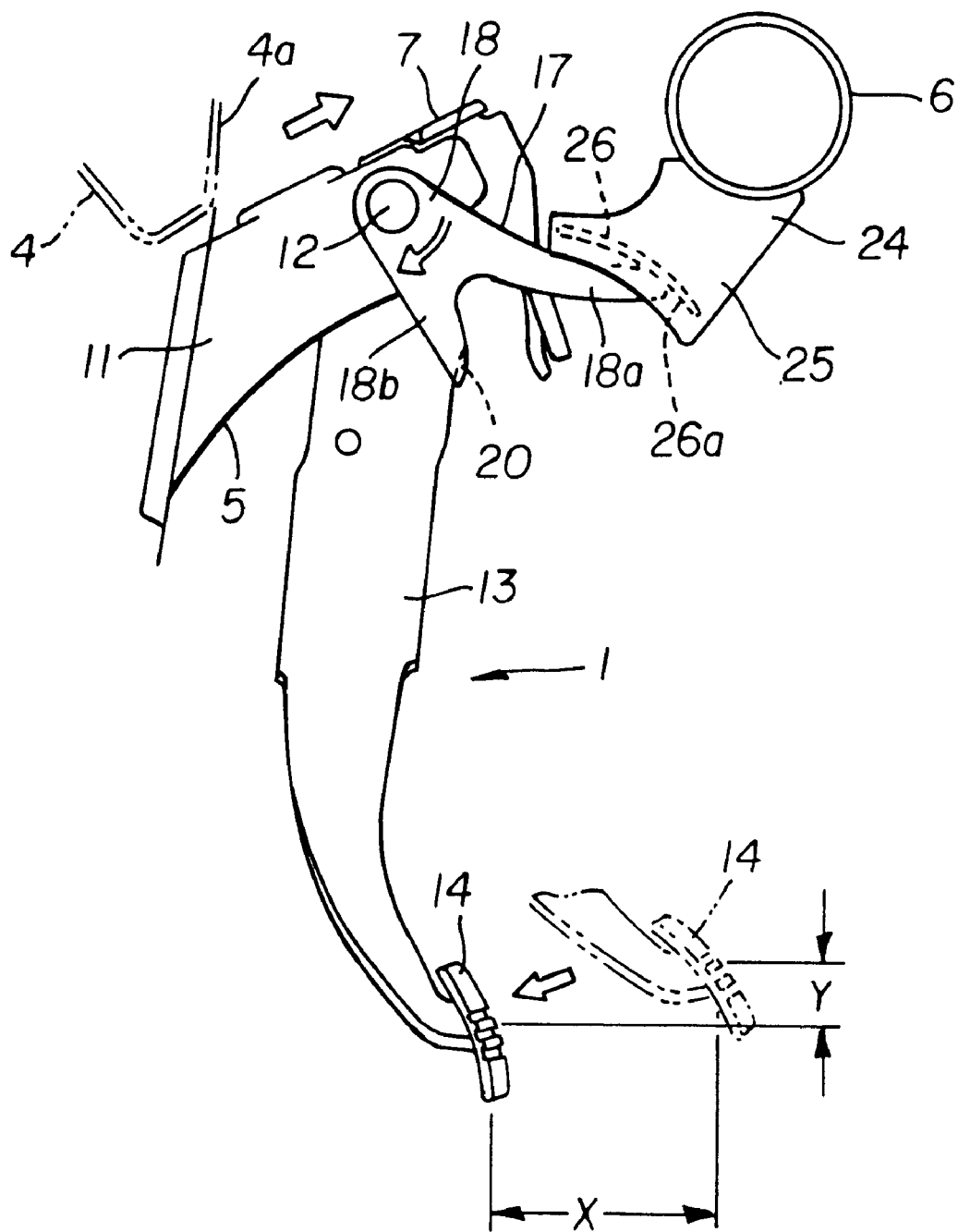
FIG. 4 is a schematic side view showing the state in which the vehicular displacement prevention structure is operating according to the first embodiment of the present invention.

If the dash panel is pressed by an external force equal to or greater than a predetermined value in a head-on collision of the vehicle and is deformed toward the rear of the vehicle, the pedal bracket 5 is released from a bolt 9 to move toward the rear of the vehicle as shown in FIG. 4.

With the movement of the pedal bracket 5, the end of the first lever portion 18a of the rotatable lever 17 enters into a space between the side plates 25 of the guide member 24 to be brought into contact with the guide plate 26. The rotatable lever 17 is guided by the guide surface 26a of the guide plate 26 so that the lever 17 is pressed downwardly, and the pressing force applies a rotational force equal to or greater than a predetermined value to the rotatable lever 17. The rotational force causes the rotatable lever 17 to rotate clockwise in FIG. 4.

In response to the clockwise rotation of the rotatable lever 17, the connecting member 20 bridged between the second lever portions 18b is brought into contact with the side edge of the pedal arm 13, and the pedal arm 13 is pressed to rotate clockwise about the spindle 12 serving as the fulcrum via the connecting member 20 and is relatively displaced toward the front of the vehicle. The displacement of the pedal arm 13 reduces the amount of movement of the pedal arm 13 toward the rear of the vehicle, i.e., the rearward movement amount of the pedal arm 13.

A chain (phantom) line in FIG. 4 indicates a position of the pedal arm 13 in the case where the pedal bracket 5 as well as the dash panel 4 moves toward the rear of the vehicle. A solid line in FIG. 4 indicates a position of the pedal arm 13 in the case where the rotatable lever 17 is rotated to press the pedal arm 13 relatively toward the front of the vehicle. As is clear from comparison in positions of the pedal arm 13 as shown in FIG. 4, the horizontal rearward movement amount of the pedal arm 13 is reduced by "X", and the vertical rearward movement amount of the pedal arm 13 is reduced by "Y".

The guide member 24 with which the rotatable lever 17 is brought into contact is comprised of the pair of side plates 25 opposed to each other, and the guide plate 26 installed halfway between the side plates. Thus, when the first lever portion 18a of the rotatable lever 17 enters into the space between the side plates 25 to be brought into contact with the guide plate 26, even if the first lever portion 18a is vibrated to the right and left by the impact resulting from the contact, the vibration is restricted by the side plates 25 at both sides of the guide plate 26. This surely prevents the first lever portion 18a from releasing from the guide plate 26. Further, since the guide plate 26 has the guide surface 26 that is smoothly curved, the end of the lever portion 18a can be smoothly guided to properly rotate the rotatable lever 17 downward.

When the vehicle body is assembled, the pedal bracket 5 and the rotatable lever 17 by the side of the dash panel 4 and the guide member 25 by the side of the deck cross pipe 6 are located apart from each other. Thus, the rotatable lever 17 and the guide member 24 are only required to be opposed to each other, and there is no necessity of assembling the rotatable lever 17 and the guide member 24 with high accuracy. Therefore, the vehicle body can easily be manufactured at a low cost.

Figure 5:
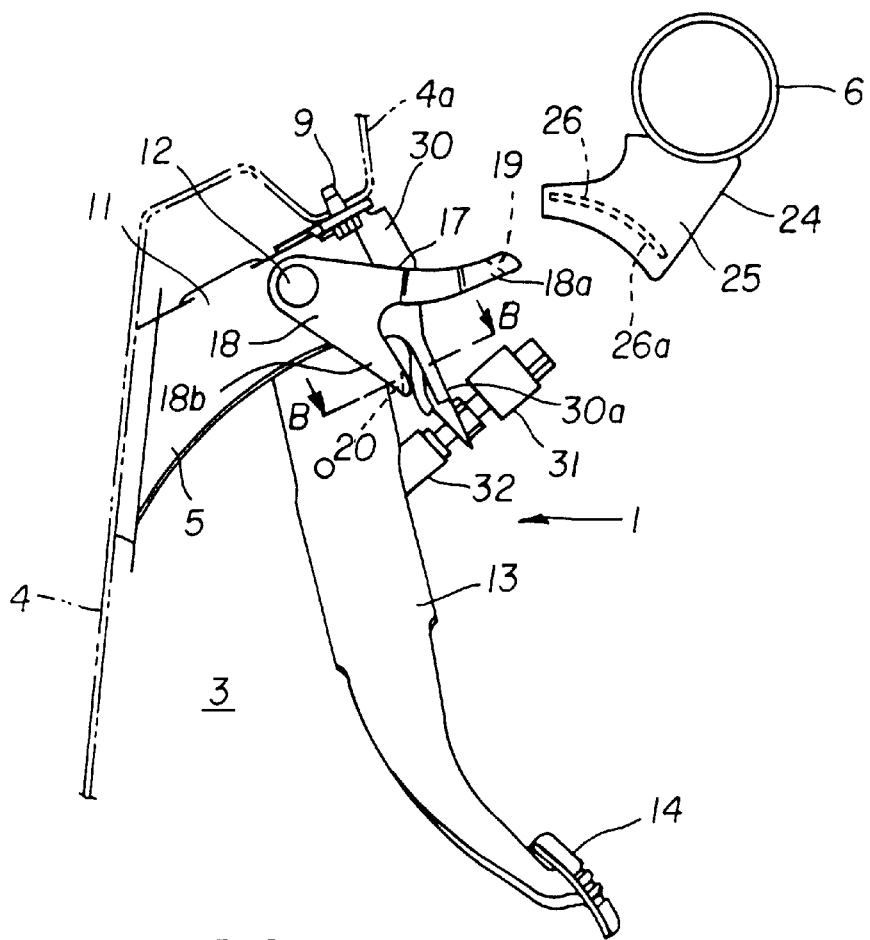
FIG. 5 is a schematic side view showing a vehicular pedal displacement prevention structure according to a second embodiment of the present invention.
Figure 6:
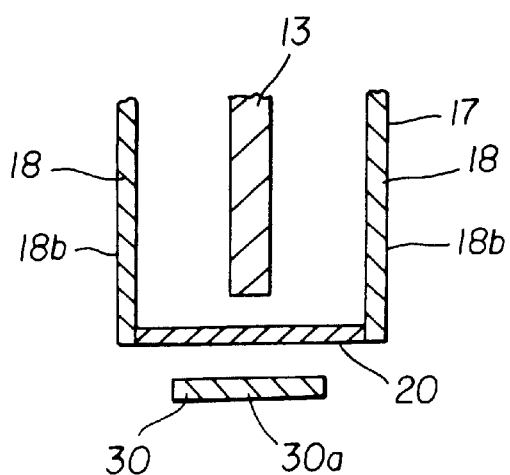
FIG. 6 is a cross section view taken along a line B—B of FIG. 5.

FIGS. 5 and 6 show a second embodiment. In this embodiment, a switch bracket 30 is mounted on the end face of the extending side of the pedal bracket 5, and the switch bracket 30 has an extending portion 30a that extends to the lower side of the pedal bracket 5 and is opposed to the pedal arm 13. A stop lamp switch 31 is attached to the extending portion 30a. An operating element 32 opposed to the stop lamp switch 31 is attached to the side edge of the pedal arm 13.

Normally, i.e., when the vehicle is not braked, the pedal arm 13 is brought into contact with the stop lamp switch 31 via the operating element 32, so that the stop lamp switch 31 is kept in the OFF state to output a non-lighting signal to a stop lamp of the vehicle. When the pedal arm 13 is stepped to brake the vehicle, i.e., when the pedal arm 13 rotates clockwise in FIG. 5 about the spindle 12, the operating element 32 of the pedal arm 13 is released from the stop lamp switch 31 so that the stop lamp switch 31 is turned on to output a lighting signal to the stop lamp of the vehicle.

As is the case with the first embodiment, the side plates 18 at both sides of a rotatable lever 17 mounted on the pedal bracket 5 via a spindle 12 are branched in a forked form at the opposite side of a supporting section, which is constituted by the spindle 12, into first lever portions 18a and second lever portions 18b. The connecting member 19 is provided between the respective ends of the first lever portions 18a, and the beam connecting member 20 is bridged between the respective ends of the second lever portions 18b.

The connecting member 19 provided between the first lever portions 18a and the connecting member 20 bridged between the second lever portions 18b are opposed to each other across the extending portion 30a of the switch bracket 30. More specifically, the connecting member 20 is bridged between the respective ends of the lever portions 18b in a space between the pedal arm 13 and the extending portion 30a of the bracket 30. This prevents interference between the rotatable lever 17 and the switch bracket 30.

As is the case with the first embodiment, if the dash panel is pressed by an external force equal to or greater than a predetermined value in a head-on collision of the vehicle and is deformed toward the rear of the vehicle to cause the pedal bracket 5 to move toward the rear of the vehicle, the end of the first lever portion 18a of the rotatable lever 17 enters into a space between side plates 25 of a guide member 24 to collide with a guide plate 26 and is guided by the guide surface 26a of the guide plate 26 to be pressed downward, and the pressing force applies a rotational force equal to or greater than a predetermined value to the rotatable lever 27. The rotational force causes the rotatable lever 17 to rotate clockwise. With the clockwise rotation of the rotatable lever 17, the connecting member 20 is brought into contact with the side edge of the pedal arm 13, and the pedal arm 13 is pressed to rotate clockwise about the spindle 12 serving as the fulcrum via the connecting member 20 and is relatively displaced toward the front of the vehicle. The displacement of the pedal arm 13 reduces the amount of movement of the pedal arm 13 toward the rear of the vehicle, i.e., the rearward movement amount of the pedal arm 13.

Normally, in vehicles of ordinary models, the switch bracket 30 is mounted on the end of the extending side of the pedal bracket as shown in FIG. 5, and the stop lamp switch 31 is mounted on the switch bracket 30.

In the present embodiment, the connecting member 20 of the rotatable lever 17 that is rotated by pressing the pedal arm 13 in the collision of the vehicle is installed in a space between the pedal arm 13 and the switch bracket 30. This prevents the rotatable lever 17 and the switch bracket 30 from interfering with each other. Therefore, conventional vehicles of ordinary models can be provided with a pedal displacement preventing function by mounting the rotatable lever 17 on the pedal bracket 5 without modifying the shape, structure, or mounting position of the switch bracket 30.

It should be understood, however, that in the present embodiment, the connecting member 20 of the rotatable lever 17 must be installed in the space between the switch bracket 30 and the pedal arm 13 while preventing the connecting member 20 from contacting with the switch bracket 30, and this imposes restrictions on the shape and structure of the rotatable lever 17 itself. This can make it difficult to ensure the strength and the ability to share the rotatable lever 17 with vehicles of other models.

FIG. 7 to FIG. 11 show a third embodiment that solves the problem of the second embodiment. In this embodiment, the rotatable lever 17 is also used as a switch bracket. More specifically, the rotatable lever 17 according to this embodiment has a simple lever structure that extends in one direction, and one end of the rotatable lever 17 is mounted on the end of the extending side of the pedal bracket 5 via the spindle 12.

The rotatable lever 17 is pressure-welded to the inner side of the pedal bracket 5 by caulking the spindle 12, and the resulting frictional force keeps the rotatable lever 17 extending substantially horizontally toward the rear of the vehicle. When an external force equal to or greater than a predetermined value is applied to the rotatable lever 17, the rotatable lever 17 rotates about the spindle 12.

The stop lamp switch 31 is mounted on the upper surface of the rotatable lever 17. A stopper pin 34 is attached to the end of the extending side of the rotatable lever 17 in the direction of the width thereof.

On the other hand, below the rotatable lever 17, a stopper plate 35 is mounted at an upper intermediate position of the pedal arm 13 by welding or the like. The stopper plate 35 extends toward the rear of the vehicle, and the operating element 32 is attached to the end of the extending side of the stopper plate 35.

Figure 7:
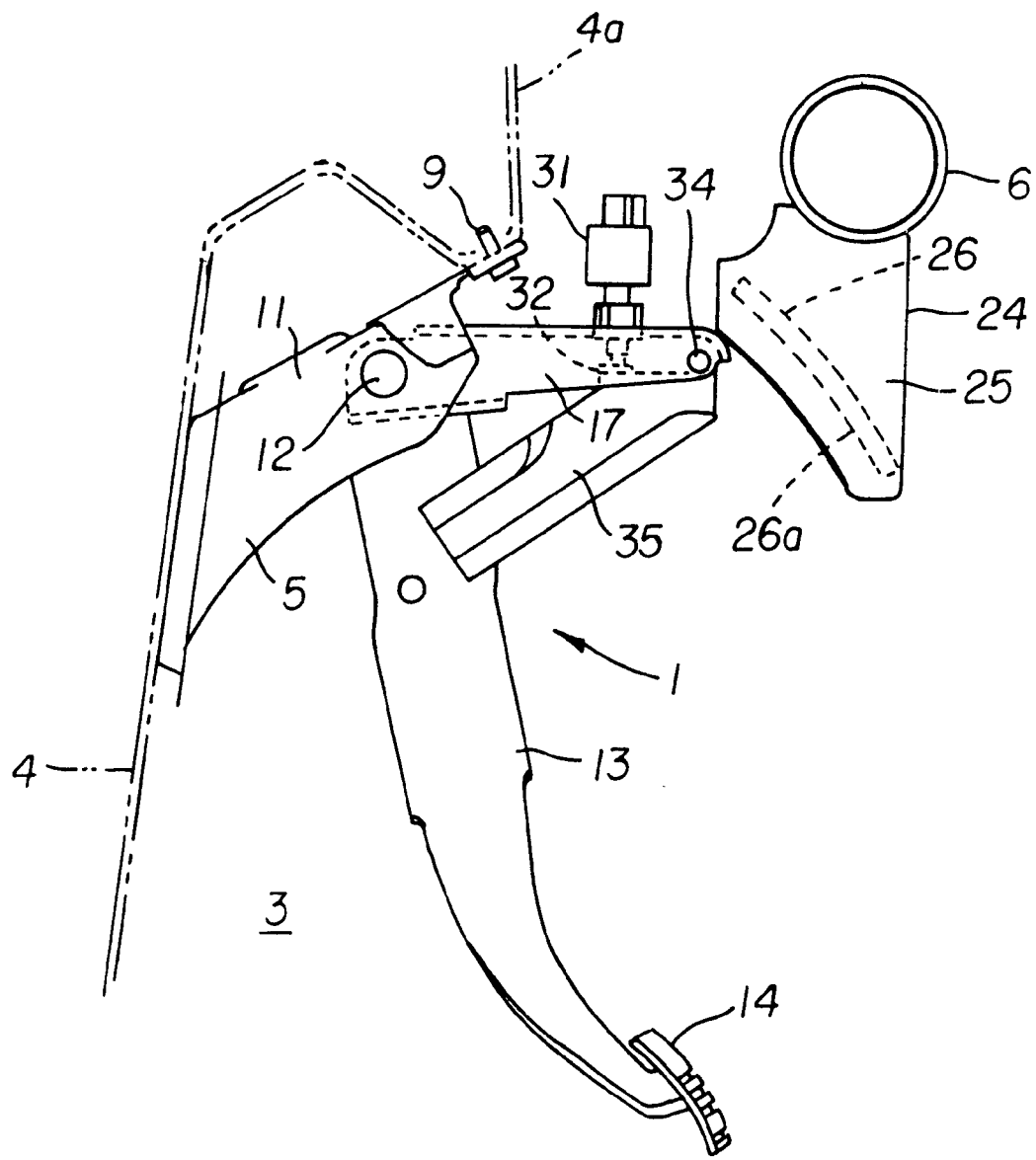
FIG. 7 is a schematic side view showing a vehicular pedal displacement prevention structure according to a third embodiment of the present invention.
Figure 8:
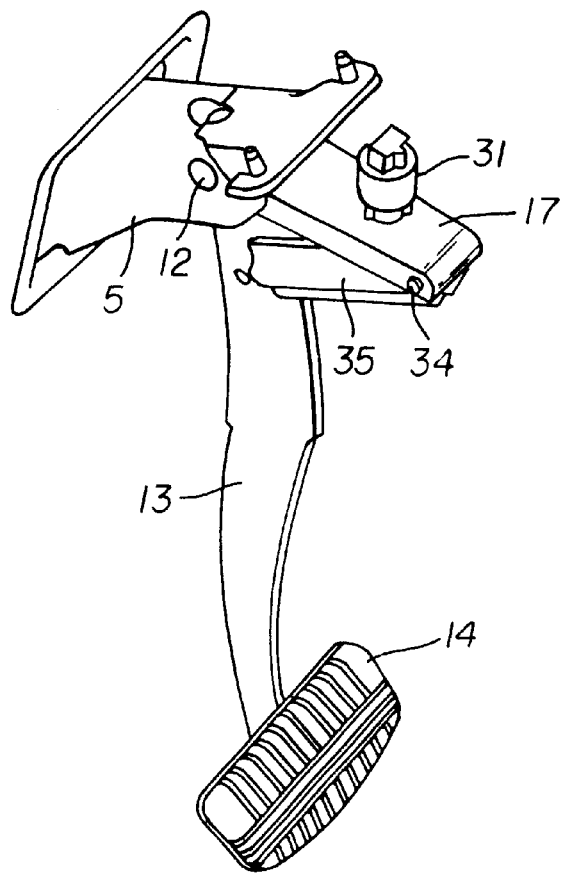
FIG. 8 is a perspective view showing the vehicular pedal displacement prevention structure according to the third embodiment of the present invention.

The end of the extending side of the stopper plate 35 is normally brought into contact with the stopper pin 34 of the rotatable lever 17 as shown in FIG. 7. In this state, the stopper plate 35 is brought into contact with the stop lamp switch 31 via the operating element 32. This contact causes the stop lamp switch 31 to be kept in OFF state to output a non-lighting signal to a stop lamp of the vehicle. When the pedal arm 13 is stepped to rotate about the spindle 12 clockwise in FIG. 7, the operating element 32 of the stopper plate 35 is released from the stop lamp switch 31 SO that the stop lamp switch 31 can be turned on to output a lighting signal to the stop lamp of the vehicle.

Figure 9:
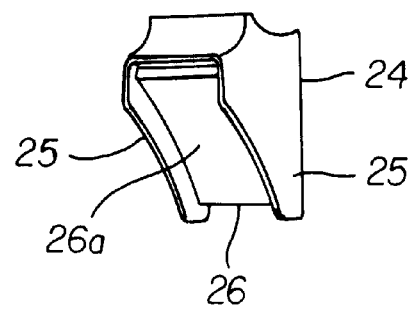
FIG. 9 is a perspective view showing a guide member according to the third embodiment of the present invention.
Figure 10:
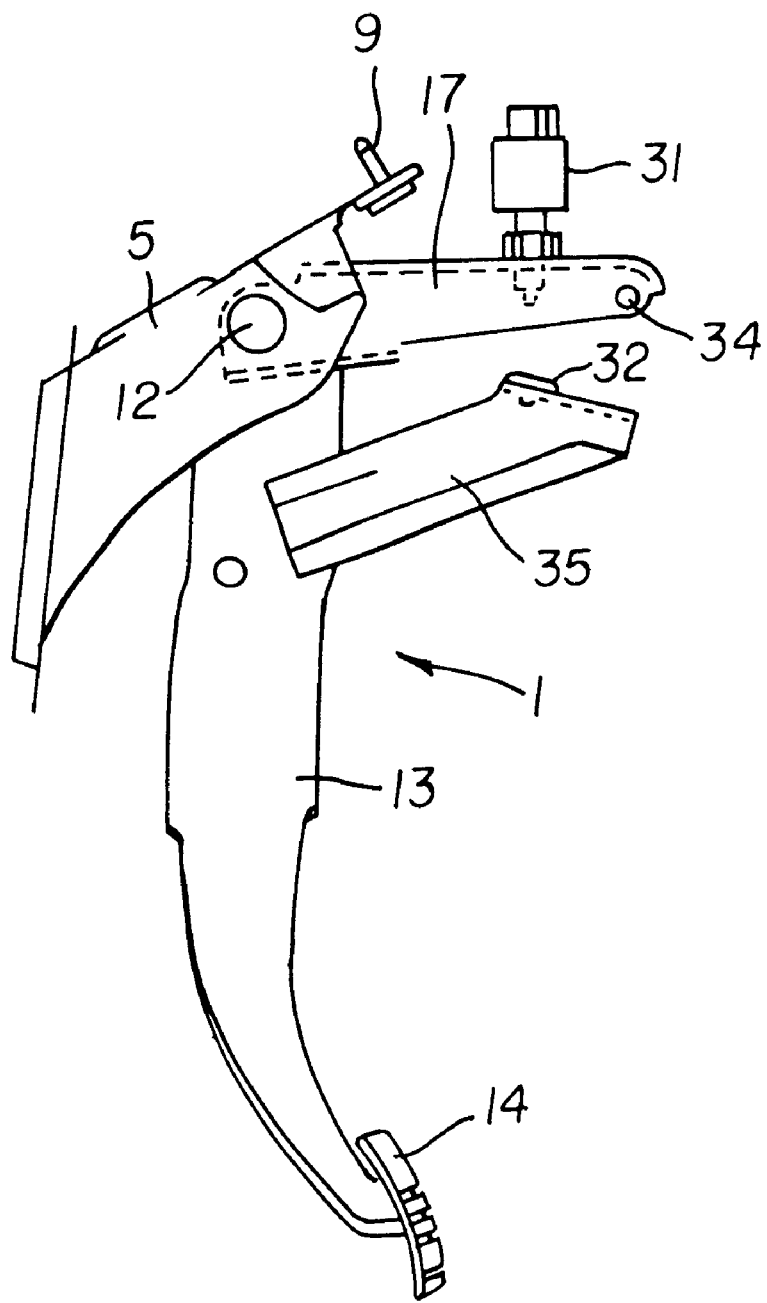
FIG. 10 is a schematic side view showing the state in which a brake pedal is stepped according to the third embodiment of the present invention.
Figure 11:
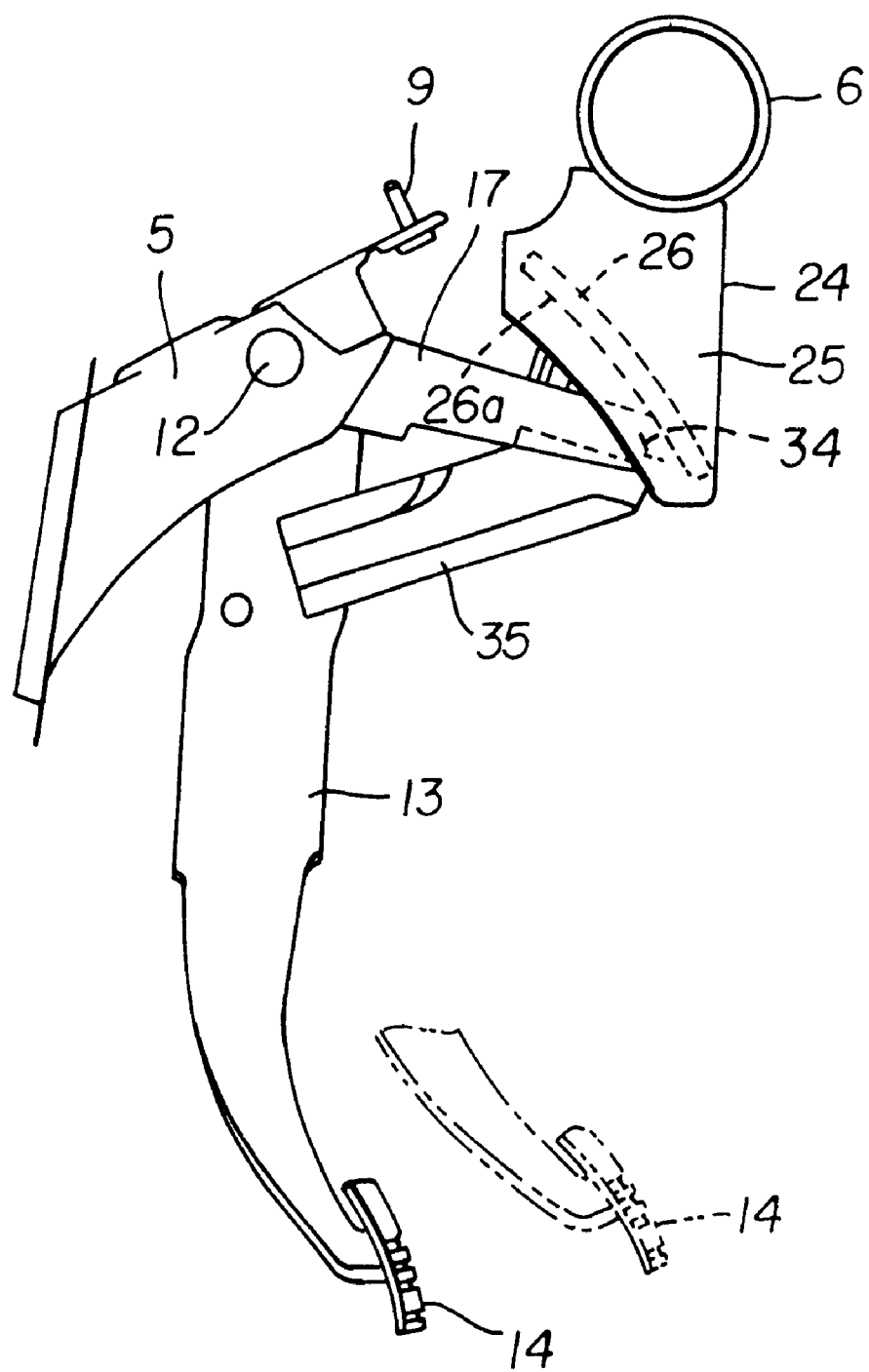
FIG. 11 is a schematic side view showing the state in which the vehicular displacement prevention structure is operating according to the third embodiment of the present invention.

Further, as is the case with the above-described embodiments, the guide member 24 opposed to the rotatable lever 17 is mounted on the deck cross pipe 6 serving as the second vehicle component. As shown in FIG. 9, the guide member 24 is comprised of the pair of side plates 25 opposed to each other, and the guide plate 26 that is positioned intermediate between the side plates 25.

The guide plate 26 is opposed with a clearance to the end of the extending side of the rotatable lever 17, and the opposing surface is the guide surface 26a that is gradually curved in a concave form.

In the present embodiment, when the dash panel 4 is pressed by an external force equal to or greater than a predetermined value due to a head-on collision of the vehicle and is deformed toward the rear of the vehicle, the pedal bracket 5 moves toward the rear of the vehicle.

With the movement of the pedal bracket 5, the end of the extending side of the rotatable lever 17 enters into a space between the side plates 25 of the guide member to collide with the guide plate 26, and is guided by the guide surface 26a of the guide plate 26 to be pressed downward. The pressing force applies a rotational force equal to or greater than a predetermined value to the rotatable lever 17, and the rotational force causes the rotatable lever 17 to rotate about the spindle 12 clockwise in FIG. 11.

With the clockwise rotation of the rotatable lever 17, the pedal arm 13 is pressed to rotate clockwise about the spindle 12 serving as the fulcrum via the stopper plate 35 and is therefore relatively displaced toward the front of the vehicle. This displacement reduces the amount of movement of the pedal arm 13 toward the rear of the vehicle, i.e., the rearward movement amount of the pedal arm 13.

The guide member 24 with which the rotatable lever 17 is brought into contact comprises a pair of side plates 25 opposed to each other and the guide plate 26 that is disposed halfway between the side plates 25. Therefore, in case of shaking to right and left by the impact when the rotatable lever 17 enters inside of the side plates 25 and hits to the guide plate 26, both side plates 25 of the guide plates 26 can prevent releasing the rotatable lever 17 from the guide plate 26. Since the guide plate 26 has a guide surface 26a curved smoothly, smooth guiding the end of the rotatable lever 17 rotates the rotatable lever 17 downward.

Incidentally, when the end portion of the rotatable lever 17 enters into the space between the side plates 25, the stop lamp switch 31 breaks down due to the impact resulting from the collision of the vehicle. Therefore, the stop lamp switch 31 never disturbs the rotating action of the rotatable lever 17.

Thus, in this embodiment, the rotatable lever 17 serves as the switch bracket that supports the stop lamp switch, and therefore, the form, structure, or layout of the rotatable lever 17 is never restricted by the relation to the switch bracket. Therefore, the form and structure of the rotatable lever 17 can be selected freely.

Therefore, the rotatable lever 17 can achieve a higher strength, and can easily be incorporated into the vehicle. Further, the rotatable lever 17 can be more flexible and applied to various models of vehicles, and also can be manufactured at a low cost.

It should be understood, however, that there is no intension to limit the invention to the specific forms disclosed, but on the contrary, the invention is to cover all modifications, alternate constructions and equivalents falling within the spirit and scope of the invention as expressed in the appended claims. For example, although in the above-described embodiment, this invention is applied to the suspended brake pedal, the invention may be applied to a suspended clutch pedal, etc.

Further, although in the above-described embodiment, the pedal arm and the rotatable arm are commonly supported by one spindle, but it goes without saying that they may be separately supported by different spindles.

What is claimed is:

1. A pedal displacement prevention structure for a vehicle, comprising:
   a first vehicle body component that is displaceable toward a rear of a vehicle when external force is applied to a front of the vehicle;
   a second vehicle body component that is displaced at a position remote from said first vehicle body component at rear of the vehicle;
   a pedal arm rotatably mounted to said first vehicle body component;
   a rotatable lever mounted to said first vehicle body component; and
   a guide member on said second vehicle body component and positioned opposite said rotatable lever,
   wherein when an external force is applied to the front of the vehicle and moves said first vehicle body component toward the rear of the vehicle, said rotatable lever is brought into contact with said guide member to rotate said rotatable lever and to displace said pedal arm toward the front of the vehicle.

2. A pedal displacement prevention structure according to claim 1, wherein said pedal arm is rotatably suspended from said first vehicle body, and said rotatable lever is mounted on a side end portion of said first vehicle body.

3. A pedal displacement prevention structure according to claim 1, wherein said first vehicle body component comprises:
   a dash panel that partitions the vehicle into an engine room and a vehicle compartment; and
   a pedal bracket mounted on said dash panel to extend toward the rear of the vehicle, wherein said pedal arm and said rotatable lever are mounted on said bracket.

4. A pedal displacement prevention structure according to claim 1, wherein said guide member comprises a guide plate with which an end of said rotatable lever is brought into contact when said pedal bracket moves toward the rear of the vehicle.

5. A pedal displacement prevention structure according to claim 1, wherein said guide member comprises a pair of side plates opposed to each other, said guide plate being positioned intermediate between said side plates.

6. A pedal displacement prevention structure according to claim 3, further including:
   a switch bracket mounted at an end portion of an extending side of said pedal bracket, said switch bracket having an extending portion opposed to said pedal arm; and a stop switch provided in the extending portion, the stop switch contacting said pedal arm when the vehicle is not braked and outputting a non-lighting signal to a stop lamp.

7. A pedal displacement prevention structure according to claim 3, wherein said rotatable lever comprises a pair of side plates opposed to each other and on both sides of said bracket, and attached to said pedal bracket via a spindle, wherein said side plates have first lever portions and second lever portions formed opposite the spindle.

8. A pedal displacement prevention structure according to claim 7, further including connecting members respectively extending between said first lever portions and between said second lever portions.

9. A pedal displacement prevention structure according to claim 8, further including a switch bracket mounted at an end portion of an extending side of said pedal bracket, said switch bracket having an extending portion opposed to said pedal arm; and a stop switch provided in the extending portion, the stop switch contacting said pedal arm when the vehicle is not braked and outputting a non-lighting signal to a stop lamp, wherein said connecting members are opposed to each other across the extending portion of said switch bracket, and said first lever portions serve as portions with which said guide member is brought into contact.

10. A pedal displacement prevention structure according to claim 8, wherein the connecting members of said second lever portion constitute a depressing part for depressing said pedal arm.

11. A pedal displacement prevention structure according to claim 3, further including a stop switch that is brought into contact with said pedal arm when the vehicle is not braked and outputs a non-lighting signal to the stop lamp, said stop switch being positioned on said rotatable lever.

12. A vehicle having a pedal displacement prevention structure comprising:

a first vehicle body component displaceable toward a rear of the vehicle when external force is applied to a front of the vehicle;

a second vehicle body component spaced from the first vehicle body component and positioned further toward the rear of the vehicle than the first vehicle body;

a pedal arm rotatably mounted to the first vehicle body component;

a rotatable lever mounted to the first vehicle body component; and a guide member on the second vehicle body component and positioned opposite the rotatable lever, wherein when the first vehicle body component moves toward the rear of the vehicle, the rotatable lever is brought into contact with the guide member to rotate the rotatable lever and to move the pedal arm toward the front of the vehicle.

13. A vehicle according to claim 12, wherein the first vehicle body component comprises a dash panel that partitions the vehicle into an engine room and a vehicle compartment, and a pedal bracket mounted on the dash panel to extend toward the rear of the vehicle, the pedal arm and the rotatable lever being mounted on the pedal bracket.

14. A vehicle according to claim 12, wherein the guide member comprises a pair of opposing side plates and a guide plate positioned intermediate between the side plates, an end of the rotatable lever being brought into contact with the guide plate when the pedal bracket moves toward the rear of the vehicle.

15. A vehicle according to claim 13, further including a switch bracket mounted at an end portion of an extending side of the pedal bracket, the switch bracket having an extending portion opposed to the pedal arm, and a stop switch provided in the extending portion, the stop switch contacting the pedal arm when the vehicle is not braked to output a non-lighting signal.

16. A vehicle according to claim 13, wherein the rotatable lever comprises a pair of opposing side plates mounted on both sides of the bracket, and attached to the pedal bracket via a spindle, wherein the side plates have first lever portions and second lever portions formed opposite the spindle.

17. A vehicle according to claim 16, further including connecting members respectively extending between the first lever portions and between the second lever portions.

18. A vehicle according to claim 17, wherein the connecting members of the second lever portion constitute a depressing part for depressing the pedal arm.

* * * * *